United States Patent [19]

Bärwald et al.

[11] 4,049,834

[45] Sept. 20, 1977

[54] HOPS AND METHOD OF MAKING SAME

[76] Inventors: Günter Bärwald, Seebadstrasse 25, 1 Berlin 28; Fritz Briem, Obere Hauptstrasse 18, 8301 Au i. d. Hallertau, both of Germany

[21] Appl. No.: 565,199

[22] Filed: Apr. 4, 1975

[30] Foreign Application Priority Data

Apr. 9, 1974 Germany .............................. 2417367

[51] Int. Cl.² ............................................... A23L 1/00
[52] U.S. Cl. .................................. 426/106; 426/124; 426/132; 426/272; 426/410; 426/419; 426/420; 426/600
[58] Field of Search ............... 426/600, 132, 418, 419, 426/420, 271, 285, 410, 386, 392, 422–424, 331, 590, 442, 454, 106, 124, 272

[56] References Cited

U.S. PATENT DOCUMENTS

| 121,902 | /1871 | Seeger et al. | 426/600 |
|---|---|---|---|
| 279,127 | /1883 | Bruns et al. | 426/600 |
| 1,161,272 | 1/1915 | Hill et al. | 426/600 |
| 2,162,609 | 6/1939 | Colemandawe | 426/285 |
| 2,248,153 | 7/1941 | Wood | 426/600 |
| 2,674,535 | 4/1954 | Meisler | 426/419 |
| 3,293,040 | 12/1966 | Shaler, Jr. et al. | 426/600 X |
| 3,433,642 | 3/1969 | Nakayama et al. | 426/600 X |
| 3,758,310 | 9/1973 | Briem et al. | 426/600 |
| 3,787,586 | 1/1974 | Hokanson et al. | 426/600 |

FOREIGN PATENT DOCUMENTS

| 2,049,712 | 3/1971 | France | |
| 1,817,636 | 6/1970 | Germany | 426/271 |

OTHER PUBLICATIONS

Hackn's Chem. Dict. 4th Ed. McGraw-Hill 1969 p. 83.
Chem. Abstracts 77:124782r (1972) Luks et al.
Chem. Abstracts 78:14500k (1973) Hanak et al.

*Primary Examiner*—Steven L. Weinstein
*Attorney, Agent, or Firm*—McCormick, Paulding & Huber

[57] ABSTRACT

Dried and comminuted hop strobiles are mixed with an inert inorganic adsorbent, such as bentonite, and pressed to form cubes, slabs, pellets etc. which may be stored in containers under vacuum or in an inert gas atmosphere. The addition of the adsorbent improves the storage life of the pressed hops in terms of preserving the bitter substances, and further accelerates the disintegration of the pressed hops during wort boiling.

14 Claims, No Drawings

HOPS AND METHOD OF MAKING SAME

BACKGROUND OF THE INVENTION

It is known to make pressed hops by drying fresh hop strobiles, to comminute the dried hop strobiles (e.g. down to a particle size of from about 2 to 10 mm) and to press the dried and comminuted hop strobiles to form shaped bodies, such as cubes, slabs or pellets. The pressed shaped bodies may then be packaged in containers which are substantially gas-impermeable. Such containers are, for instance, metal cans, but preferably bags made of plastic or aluminium foils (the latter may also be coated with plastics). The containers are usually evacuated and subsequently filled with an inert gas or an inert gas mixture. An inert gas mixture which, for instance, contains about ⅓ carbon dioxide and ⅔ nitrogen, has been found to be particularly suitable. The containers, after having been filled with the gas, are closed, e.g. by heat sealing.

According to another alternative, the dried and comminuted hop strobiles may be first placed in a foil bag, and the foil bag is then evacuated and filled with an inert gas mixture. Finally, the foil bag containing the unpressed hops may be compressed.

As a result of the evacuation and filling of the containers with an inert gas or gas mixture, the storage life of the pressed hops is greatly increased, this being due to the fact that the valuable bitter substances are protected against the access of air. The most valuable bitter substances are the α-acid or the humulone, and the β-acid or the lupulone which, by oxidation, are gradually converted into the less valuable α- and β-soft resins and eventually into the corresponding hard resins.

The α- and β-acids are highly unsaturated compounds which may polymerize by themselves, resulting in a certain resinification, even if the pressed hops are stored in an inert gas atmosphere. Furthermore, the foil bags are not absolutely gas-impermeable so that traces of oxygen may penetrate into the containers, resulting in an oxidation of the α- and β-acids, especially after prolonged storage.

Furthermore, packaged pressed hops are advantageous over the unpressed hops because they require less space during storage. However, pressed hops have a certain disadvantage in that they disintegrate relatively slowly when they are added to the beer wort.

OBJECTS OF THE INVENTION

It is, therefore, an object of the present invention to improve the storage life of the pressed hops in terms of preserving the bitter substances.

It is a further object of the present invention to accelerate the disintegration of the pressed hops when they are boiled with the beer wort.

These and other objects of the present invention will become apparent from the following description.

SUMMARY OF THE INVENTION

It has now surprisingly been found that these objects may be achieved in a simple manner by adding an inert inorganic adsorbent to the hops prior or during the compression step.

Accordingly, the invention relates to pressed hops comprising dried and comminuted hop strobiles, at least one inert inorganic adsorbent.

DESCRIPTION OF PREFERRED EMBODIMENTS

Pressed hops include the so-called pellets which are obtained by pressing the dried and comminuted hop strobiles through an apertured die having one or several apertures. This results in an increase of the temperature which probably leads to a reaction between the hops and the adsorbent. The pressed hops may also be made by pressing the hops and the adsorbents to form slabs, cubes or granulates.

Advantageously, the pressed hops contain the adsorbent in amounts of from 10 to 30%, preferably from about 15 to 20%, based on the total weight of hops and adsorbent.

The preferred adsorbent is bentonite.

The improvement of the storage life caused by the adsorbent is probably due to the fact that the valuable bitter substances penetrate into the pores of the adsorbent, and are deposited therein either by physical adsorption or by chemisorption, so that they have less tendency towards polymerisation or towards being oxidized by traces of oxygen. As a result, the yield of bitter substances is higher by about 10 percent, as compared with pressed hops to which no adsorbent has been added.

Furthermore, the adsorbent prevents the comminuted hops from sticking together, so that the compressed bodies will very rapidly disintegrate during boiling with the beer wort whereby the boiling time may be shortened. A further advantageous effect probably consists in the fact that the bitter substances from the comminuted hops diffuse into the pores of the adsorbent already during storage so that it is not necessary to extract them from the hop strobiles during the boiling with the beer wort. The extraction of the bitter substances from the pores of the adsorbent, and the simultaneous isomerisation is apparently faster, and the boiling time may also be shortened for this reason. Probably, isomerisation already takes place when the pressed bodies (pellets) are formed, due to an increase in pressure and temperature.

Furthermore, it has been found that the adsorbent binds certain substances which impart a scratching or harsh taste to the beer.

It is known to add adsorbents, such as charcoal, silica gel, kieselguhr or (preferably) bentonite to beer or beer wort. However, such substances when used in this manner only act as adsorbents for colloidal substances, such as proteins, tanning substances and anthocyanogenes. The addition of the bentonite is to prevent that these colloidally dissolved substances form precipitates or cause turbidity during storage of the beer. Furthermore, bentonite has the function of a filter aid in the clarification of the wort after boiling. It is true that the adsorbent used according to the invention also fulfills these functions during the boiling of the wort, but these are not its only functions.

In particular, it could not be predicted from the known use of these adsorbents that they will improve the storage life of pressed hops when added thereto, in terms of preserving the bitter substances, and in terms of accelerating the disintegration of the pressed bodies during the boiling process.

Furthermore, it is known to add finely divided silica to hop extracts or to fractions of hop extracts. This is done in order to convert the pasty extract into a free-flowing granulate.

According to the invention, the preferred adsorbent is activated bentonite having a specific surface area of from about 30 to 50 m²/g, a pH of from about 6 to 8, and an ion exchange capacity of from about 20 to 100 milliequivalents/g. The activation of the bentonite is effected by exchanging the calcium ions contained in the bentonite at least partially by alkali metal ions, especially sodium ions. Naturally occuring German bentonites contain a relatively large proportion of calcium; by exchanging the calcium ions by sodium ions, these bentonites become similar to the naturally occuring American sodium bentonites. The activation is generally carried out by boiling the bentonite with soda solution. Subsequently, the soluble substances are removed substantially completely by thorough washing with water.

The use of such activated bentonite is particularly advantageous, probably because its affinity towards the bitter substances ($\alpha$- and $\beta$-acids) is particularly high, and consequently the migration of the bitter acids out of the comminuted hop strobiles is favored. Furthermore, the bonding of obnoxious substances imparting a harsh taste to the beer is probably favored by the weakly alkaline nature of this bentonite, and by its effective specific surface. It is assumed that these obnoxious substances are tannic acids. Since the concentration of these obnoxious substances is relatively low, they remain bound to the available active sites of the bentonite also during the boiling process. Probably, a minor portion of the weakly acid $\alpha$-acids remains bound to the active sites; this proportion, however, is negligibly small.

Apart from and in addition to bentonite, other inert inorganic adsorbents may be used, preferably adsorbents on the basis of silica or silicates, such as silica gel, precipitated silica, or zeolithes; and aluminium oxide.

Although the invention may be applied to any type of pressed hops, it relates preferably to such pressed hops that are packaged in substantially gas-impermeable containers, e.g. a foil bag, under sub-atmospheric pressure, or in an inert gas atmosphere. Preferably, the pre-dried hops which have been comminuted to a grain size of from about 2 to 10 mm, are pressed to form shaped bodies (pellets) in an aluminium foil bag, evacuated, and the vacuum is partially broken by admitting a gas containing about ⅓ carbon dioxide and ⅔ nitrogen; finally, the foil bags including the hops are closed by heat sealing.

The boiling time of the wort which should be about 90 to 120 minutes with ordinary pressed hops, in order to obtain a maximum yield of bitter substances, may be reduced to 30 to 60 minutes when the pressed hops according to the invention are used, because said hops will easily be disintegrated and isomerized during boiling, whereby the bitter substances are transferred into the wort quickly. Therefore, the pressed hops according to the invention are particularly suitable for use in wort boiling equipment having large evaporation capacities.

The yield of bitter substances transferred to the wort is up to 10% higher, in spite of the reduced proportion of hops. Furthermore, it has been found that the solid precipitate, the so-called break separated from the wort in a "Whirlpool" is more compact if the wort has been obtained from such pressed hops. Furthermore, the foam stability of the beer is improved and the physicochemical stability of the beer is increased by the improved separation of the break.

The invention will be illustrated by the following example which is illustrative only and not limiting.

EXAMPLE

Three samples of pressed hops were prepared by drying fresh hops from the 1973 harvest down to a water content of from 10.8 to 12.5 percent by weight. The dried hops were then comminuted down to a grain size of about 4 mm. No bentonite was added to Sample No. 1; one part by weight of bentonite was added to 3 and 5 parts by weight of hops in Samples Nos. 2 and 3, respectively. The bentonite used was an activated bentonite sold by Erbsloh, Geisenheim, Germany having the above-mentioned physical data. The samples were subsequently pressed to pellets and placed in foil bags made of aluminium with an inner plastic coating. The foil bags were evacuated, filled with a gas mixture containing ⅓ carbon dioxide and ⅔ nitrogen, and closed by heat sealing. The analytical data obtained after a storage period of 6 months (at 25° – 30° C) are given in the following table.

| Sample No. | 1 | 2 | 3 |
|---|---|---|---|
| Weight ratio hops/bentonite | 1:0 | 3:1 | 5:1 |
| Percent total resins (based on dry hops) | 18.9 | 20.2 | 19.6 |
| Percent $\alpha$- and $\beta$-acids, and soft resins (based on dry hops) | 16.4 | 16.9 | 17.1 |
| Universal Bitter Value UB(mg/g) | 55.0 | 57.3 | 61.5 |
| International Bitter Value after boiling for two hours with a 12 percent wort without previous addition of hops, determined in the wort, EBC-units | 45.5 | 49.3 | 48.5 |

With Samples Nos. 2 and 3, the total resins, the $\alpha$- and $\beta$-acids and the soft resins, the Universal Bitter Value and the International Bitter Value were based on the weight of the dry hops, and not on the total weight of dry hops and bentonite. The Universal Bitter Value was determined according to the method of Schur (published in European Brewery Conv. Proc. 11th Congr., Madrid, 1967, Elsevier, Amsterdam 1968, page 61; analytical method acknowledged by *MEBAK* (Mitteleuropaische Brautechnische Analysen-Kommission). According to this method, the practically soluble proportion of bitter substances of hops and hop preparations is determined in terms of mg soluble proportion of bitter substances per g sample material.)

The International Bitter Value was determined by boiling the hops for two hours under brewery conditions, i.e. with a beer wort originally containing no hops and having an extract concentration of 12%, with an addition of 200 g pressed hops per 100 liters (without considering the bentonite). The worts were slowly cooled to about 8° C after boiling, where the hot and cold break settled out well. The bitter value was determined spectrophotometrically in the cold wort which was completely free of break.

The data given in the table show a clear superiority of Samples Nos. 2 and 3 according to the invention.

Additional experiments with Samples Nos. 2 and 3 showed the surprising result that the International Bitter Values were even higher with a boiling time of only 30 minutes, i.e. 56 and 54 EBC units, respectively, as compared to 49.3 and 48.5 EBC units obtained for a boiling time of 120 minutes. Since the boiling process results in a certain loss of bitter substances, the quick disintegration of the comminuted pressed hops according to the invention, and the shorter extraction and isomerisation times thereby obtained, are advantageous not only under the aspect of saving time, but also under the aspect of increasing the yield.

We claim:

1. A hop product pressed to form a shaped body comprising dried hop strobiles comminuted to a grain size of from about 2 – 10 mm and admixed with at least one inert inorganic adsorbent in a solid state, the adsorbent being selected from the group consisting of finely divided silica, silicates and aluminum oxide, the amount of the adsorbent being from about 10 to 30 percent, based on the total weight of hops and adsorbent.

2. Pressed shaped hops according to claim 1, wherein the amount of the adsorbent is from about 15 to 20 percent, based on the total weight of hops and adsorbent.

3. Pressed shaped hops according to claim 1, wherein the silicate adsorbent is bentonite.

4. Pressed shaped hops according to claim 3, wherein the silicate adsorbent is an alkali-activated bentonite having a specific surface of from about 30 to 50 m²/g, a pH of from about 6 to 8 and an ion exchange capacity of from about 20 to about 100 milliequivalents/g.

5. Pressed shaped hops according to claim 1, wherein said hops are packed in a substantially gas-impermeable container under sub-atmospheric pressure.

6. Pressed shaped hops according to claim 5, wherein the substantially gas-impermeable container is a sealed film envelope.

7. Pressed shaped hops according to claim 1, wherein said hops are packed in a substantially gas-impermeable container in an inert gas atmosphere.

8. Pressed shaped hops according to claim 7, wherein the substantially gas-impermeable container is a sealed film envelope.

9. Method of making pressed shaped hops comprising comminuting dried hops strobiles down to a grain size of from about 2 – 10 mm, mixing the dried and comminuted hops strobiles with at least one inert inorganic adsorbent in the solid state, the adsorbent being selected from the group consisting of finely divided silica, silicates and aluminum oxide, the amount of adsorbent being from about 10 to 30 percent based on the total weight of hops and adsorbent, and subsequently pressing said mixture through an apertured die to form a shaped body.

10. Method according to claim 9, wherein the amount of the adsorbent is from about 15 to 20 percent, based on the total weight of hops and adsorbent.

11. Method according to claim 9 comprising packaging the pressed mixture in a substantially gas-impervious container, and evacuating and sealing said container.

12. Method according to claim 9, comprising filling the pressed mixture into a substantially air-impermeable container, evacuating said container, charging said container with an inert gas or an inert gas mixture, and sealing said container.

13. Method according to claim 9, wherein the silicate absorbent is bentonite.

14. Method according to claim 13, wherein the adsorbent is an alkali-activated bentonite having a specific surface of from about 30 to 50 m²/g, a pH of from about 6 to 8 and an ion exchange capacity of from about 20 to about 100 milliequivalents/g.

* * * * *